March 7, 1967 T. C. WILSON 3,307,874
HEADREST
Filed Feb. 23, 1966 2 Sheets-Sheet 2

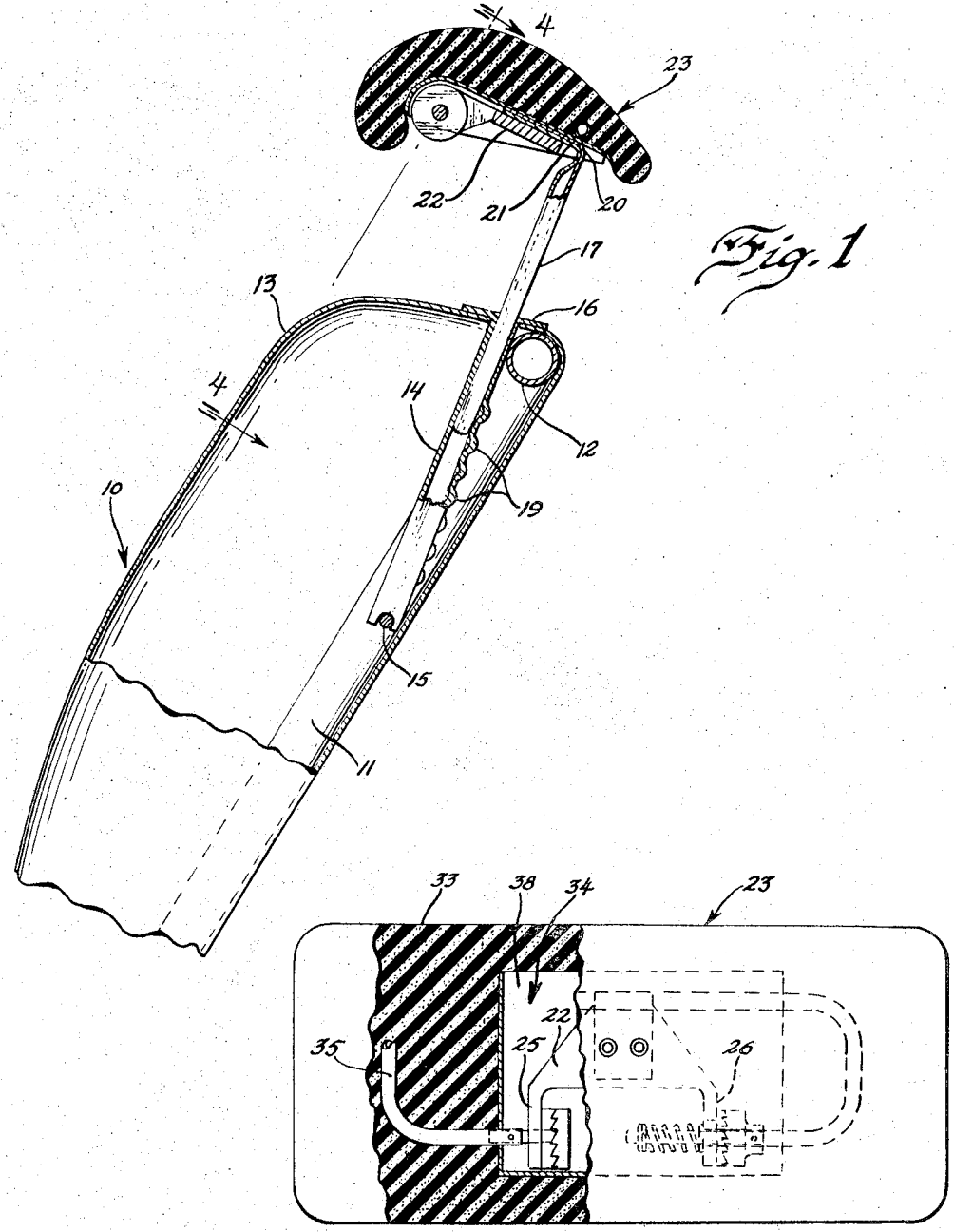

INVENTOR.
THOMAS C. WILSON
BY Carl J. Barbee
ATTORNEY

United States Patent Office 3,307,874
Patented Mar. 7, 1967

3,307,874
HEADREST
Thomas C. Wilson, Detroit, Mich., assignor to American Motors Corporation, Kenosha, Wis., a corporation of Maryland
Filed Feb. 23, 1966, Ser. No. 529,320
4 Claims. (Cl. 297—410)

The invention relates to a head rest assembly for use with the seat back rest of an automobile or with ony other seat back rest portion of a seat assembly. The invention contemplates a head rest which is readily adjustable up and down relative to the seat back rest and includes a pillow assembly which can be oscillated to several positions of adjustment relative to the supporting stem thereof.

The principal object is to provide a head rest assembly having multiple adjusting features.

A specific object is to provide a head rest assembly in which the pillow assembly may be shifted laterally relative to the supporting stem to change the position of oscillation in return direction.

Another specific object is to provide a pillow assembly mounted relative to a supporting stem so that the mechanism for effecting oscillation is largely hidden from view.

Other objects and advantages of the invention will be apparent from the ensuing specification and appended drawings in which:

FIGURE 1 is a sectional view of the head rest and of the upper portion of a seat back rest.

FIGURE 2 is a plan view, partially in section, of the head rest.

Figure 3:
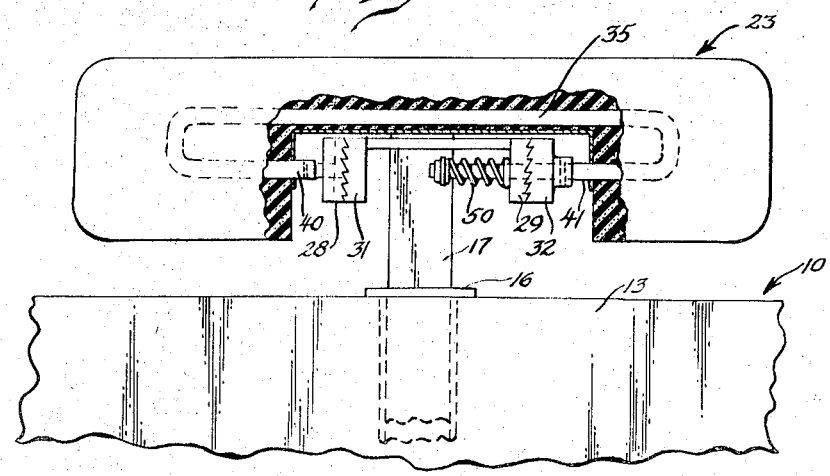
FIGURE 3 is a front view, partially in section of the head rest—a portion of the seat back rest being shown.

Referring to FIGURE 1 there is shown the upper portion of a seat back rest 10 of conventional construction. The frame for such seat back rest may consist of a tubular member having downwardly extending side portions 11 (only one of which is shown in FIGURE 1) and the interconnecting cross portion 12. The interior of the seat back rest is provided with appropriate springs or other padding and a suitable covering 13 is then added.

A tubular column 14 is mounted at its lower end on one of the cross wires 15 (which form part of the supporting structure of the back rest). At the upper end of the column a flange 16 is provided and is anchored securely to the seat back frame. The head rest assembly includes the stem 17 which is telescopically received in the column and a spring pressed ball (not shown) is carried by the stem and engages in one of the detents 19 in the column for releasably holding the head rest in a selected position of up and down adjustment relative to the column.

The upper end of the stem is flattened and then bent at 20 to provide a mounting flange 21 for being secured to the bracket 22 which serves as a support for the pillow assembly 23. The bracket is in the form of a yoke, as best shown in FIGURE 2, including the base portion 24 which is secured to stem flange 21 and spaced arms 25 and 26, each of which has a ratchet member at its end. If the yoke is in the form of a casting, then the ratchet members can be formed integrally therewith. Viewing FIGURE 4, the ratchet members 28 and 29 are secure with the arms 25 and 26 and ratchet members 31 and 32 are secure with the pillow assembly frame member.

The pillow assembly includes the pillow 33 and frame members 34 and 35. Frame member 35 may be tubular and bent into a substantially rectangular shape to serve as the reinforcing member of the pillow. Frame member or base 34 may be in the form of a stamping having side walls 36 and 37 and the interconnecting base wall 38. As viewed in FIGURE 2, the base 38 is resting on top of the stem flange 21—this being the limit of travel which the pillow assembly can be oscillated to in clockwise direction viewing FIGURE 1.

Each of the ends 40 and 41 of the frame member 35 protrude through the side walls 36 and 37 respectively. The end which protrudes through side wall 36 terminates short of the end face 42 of ratchet member 28 thereby providing the limits of back and forth travel of the pillow assembly relative to the stem 17. Ratchet member 31 is secured to the end 44 of shaft 45 and moves along with the pillow assembly when it is shifted laterally (or axially of shaft 45). Ratchet member 28 is loose on shaft 45 to permit the lateral shifting of the pillow assembly.

Figure 4:
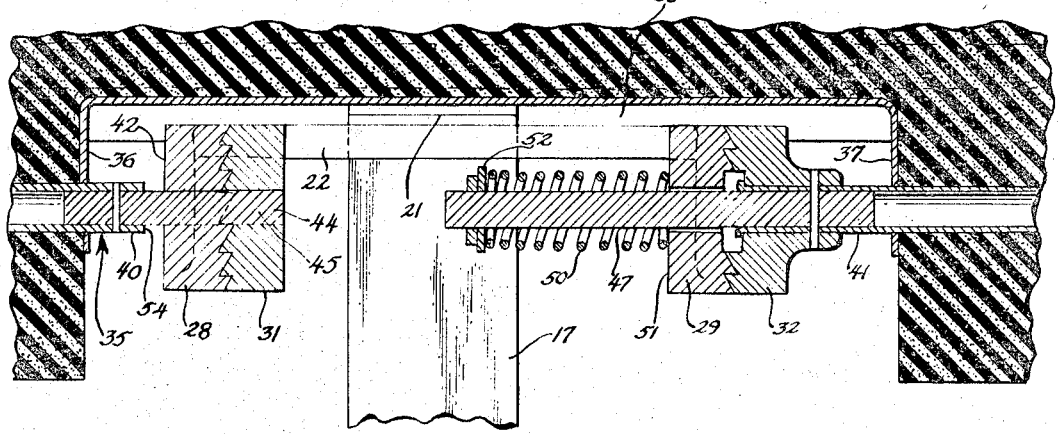
FIGURE 4 is a fragmentary sectional view of the central portion of the head rest.

The opposite end 41 of frame member 35 receives the shaft 47 and the shaft together with the hub portion of ratchet member 32 are secured to the end 41 of frame member 35. Ratchet member 29 slidably receives shaft 47. A compression spring 50 is interposed between the end face 51 and washer 52 (which is secured to shaft 47) and maintains the two sets of ratchet members in engaged position wherein the teeth thereof are in engagement (as shown best in FIGURE 4). Referring to FIGURE 1 wherein the pillow is in a position of maximum oscillation in clockwise direction, if one desires to change the position of oscillation, it is only necessary to grasp the pillow and rotate it in a counterclockwise direction. The teeth of ratchet members 31 and 32 will simply ratchet over the teeth of ratchet members 28 and 29 respectively until the desired position of oscillation of the pillow assembly is reached. Then, if it is desired to return the pillow assembly in a clockwise direction about the axes of shafts 45 and 47, it is only necessary to grasp the pillow and shift the pillow assembly laterally relative to the supporting stem 17 (in a direction axially of the ratchet members) until the end 54 of frame member 35 engages the end face 42 of ratchet member 28 (as best shown in FIGURE 4). In this position, the teeth of both sets of ratchet members are disengaged from each other axially so that the pillow assembly can be rotated freely in either direction to the desired position. Then the pillow assembly can be manually released to permit the spring 50 to shift it laterally until the teeth of both sets of ratchet members are re-engaged.

Figure 5:
FIGURE 5 is a detail plan view of one of the ratchet members.

FIGURE 5 is a detail view of ratchet member 31 to show the approximate width of the ratchet teeth 55. Viewing FIGURE 1, it will be noted that the mechanism which controls the rotative position of the pillow assembly is only discernible from underneath and when the pillow assembly is lowered until its underside engages the seat back rest, then such mechanism is not exposed to view.

I claim:
1. A head rest assembly for use with a vehicle seat back rest comprising: a stem carried by and interiorly of the seat back rest and projecting exteriorly therefrom at the upper end thereof; a pillow; a base secured to the pillow at the underside thereof and having spaced side walls at opposite ends thereof; a frame embedded in the pillow and having one end projecting through one side wall of the base and another end projecting through the other side wall of the base, said frame ends being directed toward and spaced from each other so as to be substantially axially aligned; ratchet means carried on each of the frame ends for preventing rotation of the pillow assembly relative to the stem in one direction and said means permitting rotation of the pillow assembly relative to the stem in the reverse direction; additional means permitting limited rectilinear movement of the pillow assembly relative to the stem in a direction axially of the frame ends, whereby rotation of the pillow assembly in either direction can be effected.

2. A head rest assembly for use with a vehicle seat back rest comprising: a stem carried by and interiorly of the seat back rest and projecting exteriorly therefrom at the upper end thereof; said stem having its upper end bent over; a yoke having a base portion anchored to the bent portion of the stem and spaced arms projecting from the base portion; a ratchet member secured at the end of each yoke arm; a pillow; a base secured to the pillow at the underside thereof and having spaced side walls at opposite ends thereof; a frame embedded in the pillow and having one end projecting through one side wall of the base and another end projecting through the other side wall of the base, said frame ends being directed toward and spaced from each other so as to be substantially axially aligned; an additional ratchet member on each frame end and coacting with a corresponding yoke arm ratchet member, whereby rotation of the pillow assembly about the frame end axes in one direction is prevented and rotation of the pillow assembly in the reverse direction is permitted; additional means permitting rectilinear movement of the pillow assembly relative to the stem in a direction axially of the frame ends, whereby rotation of the pillow assembly in either direction can be effected.

3. A head rest assembly as set forth in claim 1 wherein the frame is in the form of a tubular member formed in a continuous manner from one end to the other end.

4. A head rest assembly as set forth in claim 1 wherein the base is in the form of a stamping interconnecting the side walls, the extent of movement of the pillow assembly being limited at one end by engagement of the base with the upper end of the stem.

References Cited by the Examiner

UNITED STATES PATENTS

| | | | |
|---|---|---|---|
| 2,917,109 | 12/1959 | Marsh | 297—408 X |
| 3,027,194 | 3/1962 | Rumptz | 297—410 |
| 3,159,427 | 12/1964 | Lawson | 297—410 |
| 3,186,763 | 6/1965 | Ferrara | 297—410 |

FRANK B. SHERRY, *Primary Examiner.*

CASMIR A. NUNBERG, *Examiner.*